United States Patent
Funasaki

(10) Patent No.: US 9,231,905 B2
(45) Date of Patent: Jan. 5, 2016

(54) COMMUNICATION DEVICE, METHOD FOR SETTING COMMUNICATION DEVICE, AND PROGRAM

(75) Inventor: Tomoshige Funasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 13/995,852

(22) PCT Filed: Dec. 19, 2011

(86) PCT No.: PCT/JP2011/079317
§ 371 (c)(1),
(2), (4) Date: Jun. 19, 2013

(87) PCT Pub. No.: WO2012/086571
PCT Pub. Date: Jun. 28, 2012

(65) Prior Publication Data
US 2013/0275622 A1    Oct. 17, 2013

(30) Foreign Application Priority Data

Dec. 22, 2010 (JP) ................. 2010-285839

(51) Int. Cl.
*G06F 15/16* (2006.01)
*H04L 29/12* (2006.01)
*H04L 12/24* (2006.01)

(52) U.S. Cl.
CPC ............ *H04L 61/20* (2013.01); *H04L 61/2007* (2013.01); *H04L 61/2092* (2013.01); *H04L 41/0806* (2013.01); *H04L 61/6022* (2013.01)

(58) Field of Classification Search
USPC ........................................................ 709/245
See application file for complete search history.

(56) References Cited

U.S. PATENT DOCUMENTS

| | | | |
|---|---|---|---|
| 6,421,732 B1* | 7/2002 | Alkhatib et al. | 709/245 |
| 6,560,221 B1* | 5/2003 | Hara et al. | 370/352 |
| 6,567,664 B1* | 5/2003 | Bergenwall et al. | 455/435.1 |
| 6,628,620 B1* | 9/2003 | Cain | 370/248 |
| 7,831,697 B2* | 11/2010 | Fukushima | 709/223 |
| 7,860,024 B1* | 12/2010 | Greenberg et al. | 370/254 |
| 7,925,722 B1* | 4/2011 | Reed et al. | 709/220 |
| 7,936,779 B2* | 5/2011 | Risberg et al. | 370/465 |
| 7,962,605 B2* | 6/2011 | Chen | 709/224 |
| 7,966,650 B2* | 6/2011 | Manring et al. | 726/3 |
| 7,974,311 B2* | 7/2011 | Vesterinen et al. | 370/475 |
| 7,979,582 B2* | 7/2011 | Okazaki et al. | 709/245 |
| 8,089,967 B2* | 1/2012 | Hazard | 370/395.31 |

(Continued)

FOREIGN PATENT DOCUMENTS

| | | | |
|---|---|---|---|
| JP | 2003-318943 A | 11/2003 | |
| JP | 2006-135507 A | 5/2006 | |

(Continued)

*Primary Examiner* — Melvin H Pollack
(74) *Attorney, Agent, or Firm* — Sughrue Mion, PLLC

(57) ABSTRACT

A communication device includes an address generation unit that generates address information, a reply request transmission unit that transmits a reply request to request a reply from the other communication device having the address information generated by the address generation unit, and an address setting unit that sets the address information generated by the address generation unit as address information of the communication device when the reply to the reply request is not received, wherein the address generation unit generates address information different from the previously generated address information when the reply to the reply request is received.

5 Claims, 3 Drawing Sheets

(56) References Cited

U.S. PATENT DOCUMENTS

| | | | |
|---|---|---|---|
| 8,090,828 B2 * | 1/2012 | Leung et al. | 709/226 |
| 8,094,666 B2 * | 1/2012 | Cagenius | 370/401 |
| 8,179,872 B2 * | 5/2012 | Bienfait et al. | 370/338 |
| 8,365,018 B2 * | 1/2013 | McIntosh et al. | 714/23 |
| 8,437,263 B2 * | 5/2013 | Sundar et al. | 370/248 |
| 8,560,658 B2 * | 10/2013 | Bedare et al. | 709/223 |
| 8,625,610 B2 * | 1/2014 | Asati et al. | 370/401 |
| 8,630,645 B2 * | 1/2014 | Chowdhury et al. | 455/436 |
| 8,671,172 B2 * | 3/2014 | Christenson et al. | 709/222 |
| 8,717,931 B2 * | 5/2014 | Taniuchi et al. | 370/254 |
| 8,787,390 B2 * | 7/2014 | Eisl et al. | 370/400 |
| 8,831,587 B2 * | 9/2014 | Pollakowski et al. | 455/422.1 |
| 8,938,553 B2 * | 1/2015 | Ly et al. | 709/236 |
| 8,949,411 B2 * | 2/2015 | Tiwari et al. | 709/224 |
| 8,966,018 B2 * | 2/2015 | Bugwadia et al. | 709/220 |
| 8,972,547 B2 * | 3/2015 | Christenson | 709/222 |
| 2010/0287582 A1 * | 11/2010 | Barnett, Jr. | 725/25 |
| 2011/0138081 A1 * | 6/2011 | Matsuda et al. | 709/250 |

FOREIGN PATENT DOCUMENTS

| | | |
|---|---|---|
| JP | 2007-201917 A | 8/2007 |
| JP | 2008-99251 A | 4/2008 |

\* cited by examiner

COMMUNICATION DEVICE, METHOD FOR SETTING COMMUNICATION DEVICE, AND PROGRAM

CROSS REFERENCE TO RELATED APPLICATIONS

This application is a National Stage of International Application No. PCT/JP2011/079317, filed on Dec. 19, 2011, which claims priority from Japanese Patent Application No. 2010-285839, filed on Dec. 22, 2010, the contents of all of which are incorporated herein by reference in their entirety.

TECHNICAL FIELD

The present invention relates to a communication device connected to other communication devices to form a management network, a method for setting the communication device, and a program.

BACKGROUND ART

To operate a communication device (an optical communication device, a wireless communication device, or the like connected to a wireless base station device) of a backbone system, it is necessary to perform initial setting (setting of the physical layer in the Open Systems Interconnection (OSI) reference model) of a main signal relation in each communication device. In the initial setting of the communication device, a worker connects a maintenance terminal to the communication device and performs the setting of the main signal relation on the communication device through the maintenance terminal. The communication device basically performs one-to-one communication and performs the communication without use of address information.

To manage respective communication devices, it is necessary to form a management network including the communication devices as constituent elements, connect a management device (NMS: Network Management System) to the management network, and perform communication with the respective communication devices. However, in the initial setting of the main signal relation in the communication device, initial setting of the management network is not performed in many cases. For example, the reasons are that technology skills necessary for the setting are different, a management part of the management network and a management part performing the initial setting of the communication devices are different in many portions, and address information used in the management network is not used in communication of main signals. In general, the minimum initial setting of the main signal relation is performed during the installation work of the devices and the initial setting of the management network is often performed at a start timing of a subsequent operation.

For this reason, when the management network including the respective communication devices as the constituent elements is configured, an administrator determines address information assigned to the respective communication devices after completion of the installation of the respective communication devices and the initial setting of the main signal relation. Thereafter, a worker arrives at installation places of the communication devices again and performs the initial setting of the management network such as setting of the address information. After the time of completion of the initial setting of the management network, the communication devices can be set from a management device installed at a remote place from the communication devices. Therefore, operations of the communication devices start.

Patent documents 1 and 2 disclose methods of setting address information in a communication device.

DOCUMENTS OF THE PRIOR ART

Patent Documents

Patent Document 1: Japanese Unexamined Patent Application, First Publication No. 2003-318943
Patent Document 2: Japanese Unexamined Patent Application, First Publication No. 2006-135507

DISCLOSURE OF INVENTION

Problems to be Solved by the Invention

As described above, when the initial settings of the main signals and the management network are performed at different timings, it is necessary to dispatch a worker to installation places of the devices installed in different nations, continents, or the like a plurality of times, thereby resulting in a problem that efficiency is poor.

In both methods of setting the address information, as disclosed in patent document 1 and patent document 2, a server device is provided. In this case, the server device is used to determine the address information and detect duplication of the address information. However, to set the address information using the server apparatus, it is necessary to set the server apparatus before the installation of the communication devices. Further, when the server device is broken, there is a problem that the address information may not be set.

According to a first aspect of the invention, there is provided a communication device connected to other communication devices different from the communication device to form a management network. The communication device includes: an address generation unit that generates address information; a reply request transmission unit that transmits a reply request to request a reply from the other communication device having the address information generated by the address generation unit; and an address setting unit that sets the address information generated by the address generation unit as address information of the communication device when the reply to the reply request is not received. The address generation unit generates address information different from the previously generated address information when the reply to the reply request is received.

According to a second aspect of the invention, there is provided a method for setting a communication device connected to other communication devices to form a management network using the communication device. The method includes: generating, by an address generation unit, address information; transmitting, by a reply request transmission unit, a reply request to request a reply from the other communication device having the address information generated by the address generation unit; generating, by the address generation unit, address information different from the previously generated address information when the reply to the reply request is received; and setting, by an address setting unit, the address information generated by the address generation unit as address information of the communication device when the reply to the reply request is not received.

According to a third aspect of the invention, there is provided a program causing a computer of a communication device connected to other communication devices to form a management network to function as: an address generation unit that generates address information; a reply request transmission unit that transmits a reply request to request a reply from the other communication device having the address information generated by the address generation unit; and an address setting unit that sets the address information generated by the address generation unit as address information of the communication device when the reply to the reply request is not received. The address generation unit generates address information different from the previously generated address information when the reply to the reply request is received.

Effects of the Invention

According to the aspects of the invention, when the reply to the reply request destined to a device having the address information generated by the address generation unit is not returned, the generated address information is determined to be the address information of the communication device itself. Thus, even when a server device is not provided to the management network, the management network can be constructed of only the communication devices.

EMBODIMENTS FOR CARRYING OUT THE INVENTION

Hereinafter, an embodiment of the invention will be described in detail with reference to the drawings.

Figure 1:
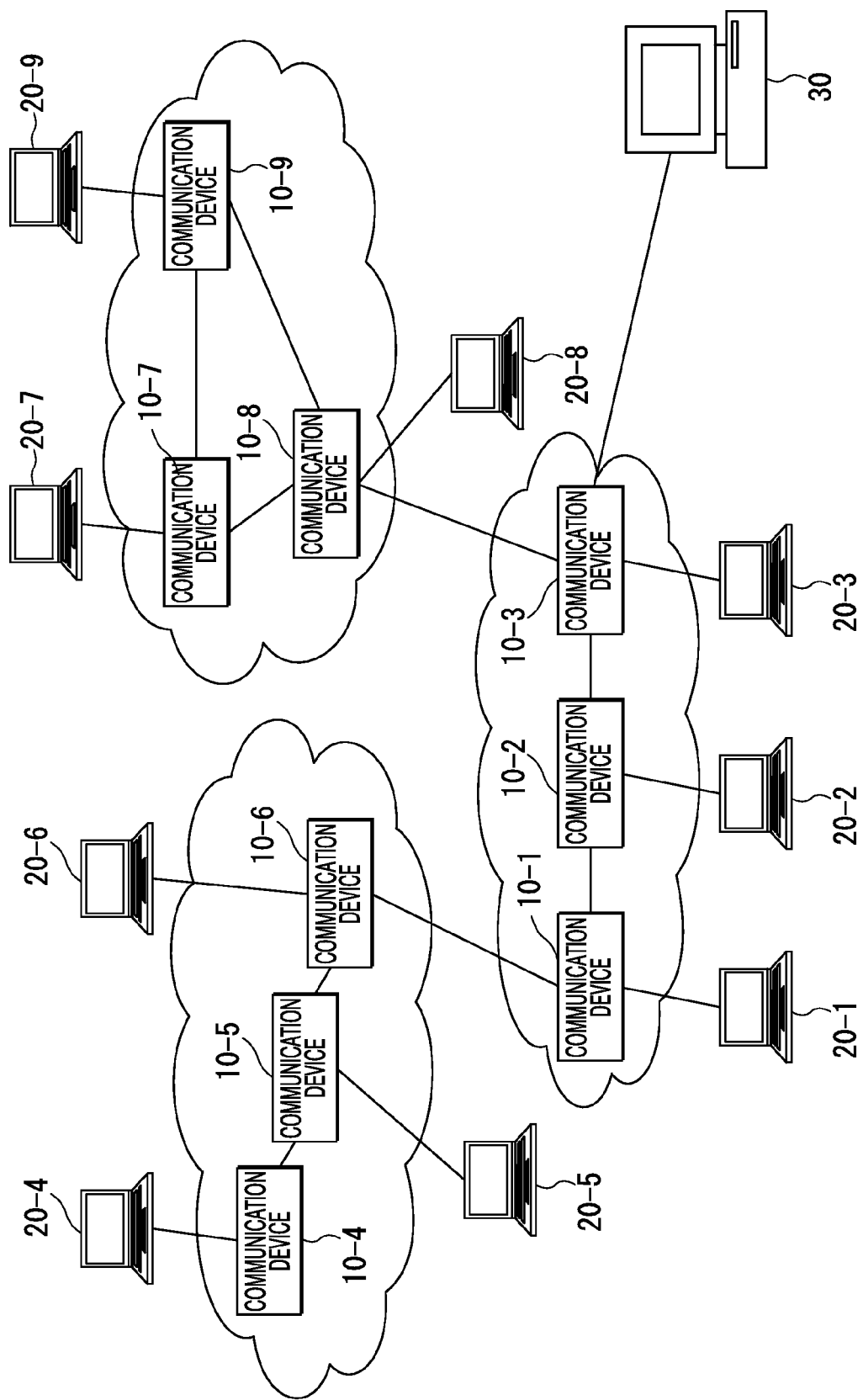
FIG. 1 is a diagram illustrating the configuration of a management network including a communication device according to an embodiment of the invention.

FIG. 1 is a diagram illustrating the configuration of a management network including communication devices 10 according to the embodiment of the invention.

The management network includes a plurality of communication devices 10-1 to 10-9 (hereinafter referred to as the communication devices 10 when the communication devices 10-1 to 10-9 are referred to collectively) and a management device 30. The communication devices 10 each receive setting of a main signal relation from maintenance terminals 20-1 to 20-9 (hereinafter referred to as the maintenance terminals 20 when the maintenance terminals 20-1 to 20-9 referred to collectively).

A communication device 10 performs communication with the other directly connected communication devices 10 (or the other communication devices 10, which are referred to as adjacent devices below) using a main signal. The communication devices 10 form a management network to perform maintenance management of the communication devices 10 using an overhead of the main signal.

The maintenance terminal 20 is a terminal that is used when an initial setting of the communication device 10 is performed. The maintenance terminal 20 may be disconnected from the communication device 10 after the initial setting is completed.

The management device 30 is a device that monitors the state of each of the communication devices 10. The management device 30 checks the state of each of the communication devices 10 using the overhead of the main signal in the communication of the communication devices 10.

Next, the configuration of a communication device 10 will be described.

Figure 2:
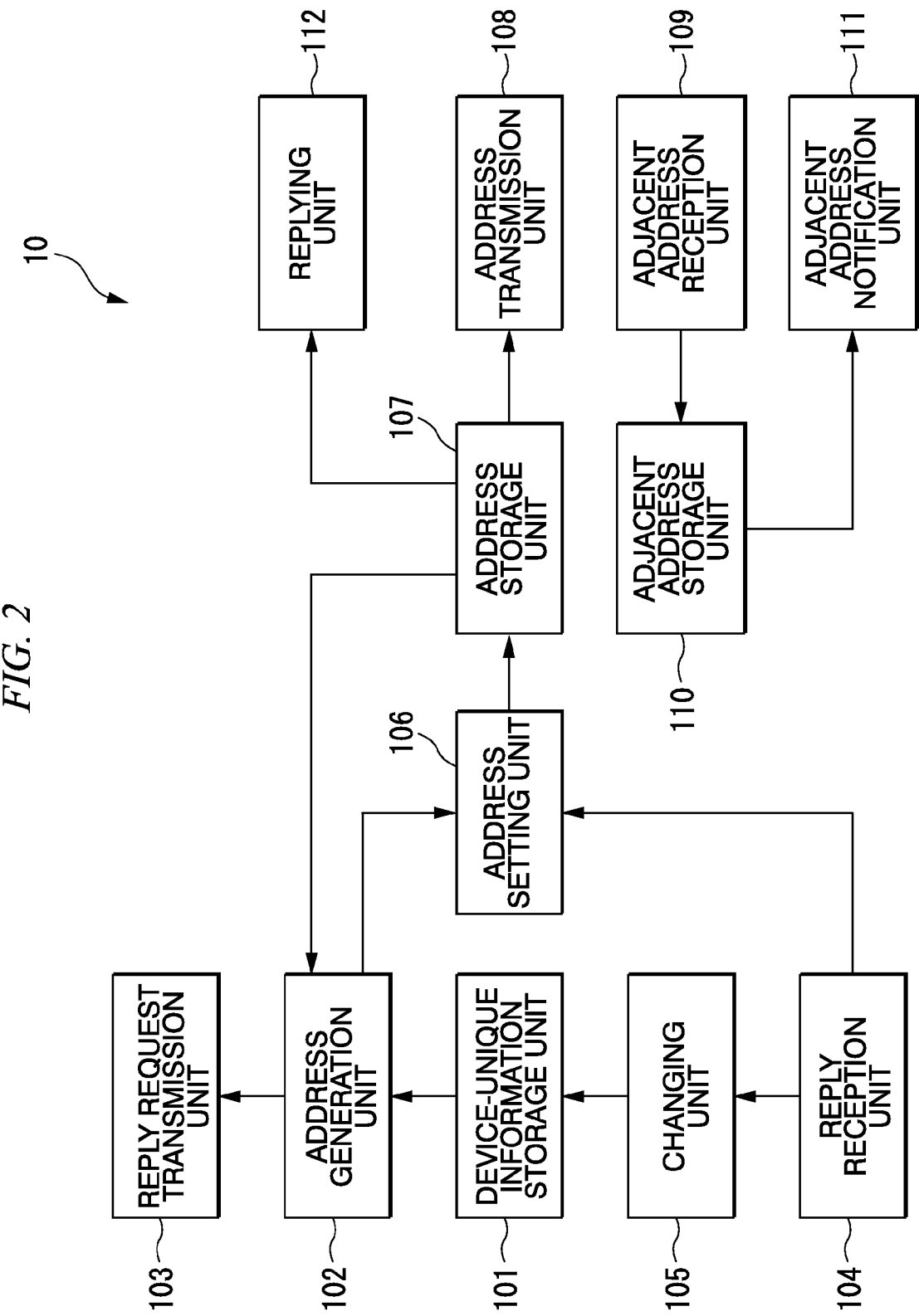
FIG. 2 is a schematic block diagram illustrating the configuration of the communication device according to the embodiment of the invention.

FIG. 2 is a schematic block diagram illustrating the configuration of the communication device 10 according to the embodiment of the invention.

The communication device 10 includes a device-unique information storage unit 101, an address generation unit 102, a reply request transmission unit 103, a reply reception unit 104, a changing unit 105, an address setting unit 106, an address storage unit 107, an address transmission unit 108, an adjacent address reception unit 109, an adjacent address storage unit 110, an adjacent address notification unit 111, and a replying unit 112.

The device-unique information storage unit 101 stores device-unique information uniquely assigned to each of the communication devices 10. As the device-unique information, for example, a MAC address, the serial number of a device, a manufacturing number, or the like can be used. The device-unique information preferably has a value different from that of each device so that a duplication probability of an address automatically generated through a process to be described below is small.

The address generation unit 102 generates the address information using the device-unique information stored in the device-unique information storage unit 101 as a parameter of a predetermined unidirectional function. For example, an IP address is used as the address information.

The reply request transmission unit 103 transmits the address information generated by the address generation unit 102 and a reply request to an adjacent device. When the reply request is received, the adjacent device (the other communication device 10) determines whether the adjacent device has the address information identical with the generated address information. When the adjacent device has the identical address, the adjacent device replies to the reply request. When the adjacent device determines that it does not have the address information identical with the address information generated by the address generation unit 102, the adjacent device transmits the reply request to the other adjacent device. That is, the reply request transmission unit 103 transmits the reply request to request the reply from the other communication device 10 having the address information generated by the address generation unit 102.

The reply reception unit 104 receives the reply to the reply request during a given time after the reply request transmission unit 103 transmits the reply request.

When the reply reception unit 104 receives the reply to the reply request, the changing unit 105 outputs an instruction to generate other address information to the address generation unit 102.

When the reply reception unit 104 does not receive the reply to the reply request during the given time, the address setting unit 106 sets the address information generated by the address generation unit 102 as the address information of the own communication device and records the address information in the address storage unit 107.

The address storage unit 107 stores the address information of the communication device itself.

The address transmission unit 108 transmits the address information stored in the address storage unit 107 to the adjacent device.

The adjacent address reception unit 109 receives the address information of the adjacent device from the adjacent device and records the address information in the adjacent address storage unit 110.

The adjacent address storage unit 110 stores the address information of the adjacent device.

The adjacent address notification unit 111 receives a request to transmit the address information of the adjacent device from the management device 30 and transmits the address information stored in the adjacent address storage unit 110 to the management device 30.

The replying unit 112 receives the reply request transmitted from the other communication device 10 and announces a reply when the address information stored in the address storage unit 107 is identical with the address information indicated by the received reply request. The replying unit 112 transmits the received reply request to the adjacent device when the address information is determined to be different.

In this embodiment, a medium for main signal communication is used as a communication medium of the management network. Examples of the medium for the main signal communication include kinds of optical fibers, a LAN cable, and wireless. A method for using the main signal medium in the management network is defined according to a technology of the main signal communication. For example, Data Communication Channels (DCC) of Synchronous Optical NETwork (SONET)/Synchronous Digital Hierarchy (SHD), General Communication Channels (GCC) of Optical Transport Network (OTN), Virtual LAN (VLAN) of Ethernet (registered trademark), or the like can be used.

Next, an operation of the communication device 10 will be described.

Figure 3:
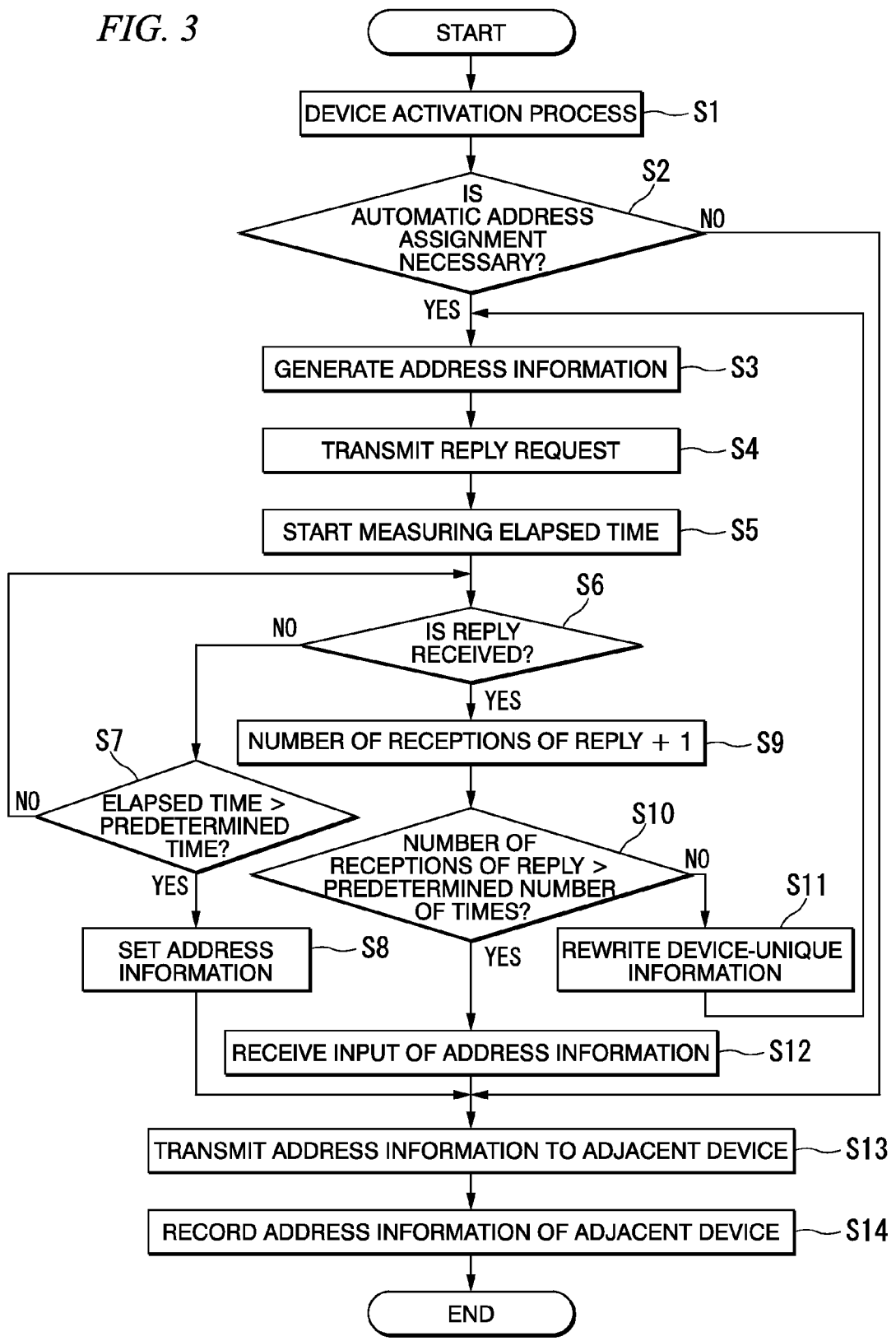
FIG. 3 is a flowchart illustrating an operation of the communication device according to the embodiment of the invention.

FIG. 3 is a flowchart illustrating the operation of the communication device 10.

When the communication device 10 is installed, a worker ends initial setting of a main signal relation, and an activation trigger is given, the communication device 10 performs an activation process (step S1). When the communication device 10 is activated, the address generation unit 102 determines whether automatic assignment of the address information is necessary (step S2). As the case in which the automatic assignment of the address information is not necessary, a case in which the automatic assignment of the address information is completed previously or a case in which a worker explicitly sets an address are exemplary examples. Specifically, when the address information is already stored in the address storage unit 107, the address generation unit 102 determines that the automatic assignment of the address information is not necessary.

When the address generation unit 102 determines that the automatic assignment of the address is necessary (YES in step S2), the address generation unit 102 acquires the device-unique information from the device-unique information storage unit 101 and generates the address information based on the device-unique information acquired as the parameter of the predetermined unidirectional function (step S3). A range of the address information is set in advance so that the communication devices 10 to which this system is applied can perform communication. This information is preferably set in advance by setting or the like at the time of factory shipment. For example, when a serial number is "12345ABC" and an address setting range is designated as a range of "192.168.1.1" to "192.168.1.255" of an IPv4 address as the device-unique information, the address generation unit 102 generates "192.168.1.119" as the address information. This address information is an example and is changed by a value given as the parameter of the unidirectional function.

When the address information to be automatically assigned is determined, the reply request transmission unit 103 transmits, to the adjacent device, a reply request to request a reply from the other communication device 10 having the same address information as the determined address information (step S4). The reply reception unit 104 awaits reception of the reply to the reply request transmitted by the reply request transmission unit 103. At this time, the reply reception unit 104 measures the elapsed time from the time at which the reply request transmission unit 103 transmits the reply request (step S5).

The reply reception unit 104 determines whether to receive the reply from the other communication device 10 (step S6). When the reply reception unit 104 does not receive the reply from the other communication device 10 (NO in step S6), the reply reception unit 104 determines whether the measured elapsed time exceeds a predetermined time (step S7). When the elapsed time does not exceed the predetermined time (NO in step S7), the process returns to step S6 and the reply reception unit 104 awaits the reception of the reply.

Conversely, when the elapsed time exceeds the predetermined time (YES in step S7), it is determined that the address information generated by the address generation unit 102 is not assigned to the other communication device 10. Then, the address setting unit 106 sets the generated address information to the address of the communication device itself and records the set address information in the address storage unit 107 (step S8). Thus, the communication device 10 can communicate with another device via the management network.

When the reply reception unit 104 receives the reply from the other communication device 10 in step S6 (YES in step S6), the reply reception unit 104 adds 1 to the number of receptions of the reply stored in an internal memory (step S9). Next, the reply reception unit 104 determines whether the number of receptions of the reply exceeds a predetermined number of times (for example, 10 times) (step S10). When the reply reception unit 104 determines that the number of receptions of the reply does not exceed the predetermined number of times (NO in step S10), the changing unit 105 instructs the address generation unit 102 to change the address information. Thus, the address generation unit 102 generates address information different from the previous address information (step S11). When generating the address information after two times, the address generation unit 102 generates the address information without using the device-unique information stored by the device-unique information storage unit 101. For example, a method of adding 1 to the previous address information or a method of determining the address information at random may be used. Then, the process returns to step S4 and the reply request is transmitted.

Further, when the reply reception unit 104 determines that the number of receptions of the reply exceeds the predetermined number of times (YES in step S10), the address setting unit 106 receives an input of the address information by a worker, sets the input address information as the address of the communication device itself, and records the set address information in the address storage unit 107 (step S12).

When the address setting unit 106 performs the setting of the address information and the recording of the address information in the address storage unit 107 in step S8 and step S12 or the address generation unit 102 determines that the automatic assignment of the address is not necessary in step S2 (NO in step S2), the address transmission unit 108 transmits the address information stored by the address storage unit 107 to an adjacent device (step S13). At this time, when the adjacent device receives the address information from the communication device 10, the adjacent device records the received address information and transmits the address information of the adjacent device to the communication device 10.

The adjacent address reception unit 109 records the address information received from the adjacent device in the adjacent address storage unit 110 (step S14). In this process, the address information present on the management network is acquired and accessed from the management device 30 or the maintenance terminal 20 is enabled. As a method for acquiring the address information of the adjacent device, for example, Link Layer Discovery Protocol (LLDP) or Point to Point Protocol (PPP) can be used.

By performing the above-described process, the communication device 10 can assign the address information to the communication device itself and store the address information of the adjacent device.

A method of actually performing the address setting of the management network in the entire network will be described using the above-described processing order with reference to FIG. 1.

In FIG. 1, first, the worker performs the initial setting of the main signal relation in the communication devices 10-1 to 10-3 using the maintenance terminals 20-1 to 20-3. First, the worker performs the initial setting of the main signal relation of the communication device 10-1. At this time, the worker also sets a monitoring line using an overhead or the like of the main signal simultaneously. Then, the communication device 10-1 generates the address information from the device-unique information. At this time, since there are no communication devices 10 connected to the management network other than the communication device 10-1, the address information is not duplicated and the communication device 10-1 can determine the address information of the communication device itself Next, the worker performs the initial setting relevant to the main signal of the communication device 10-2. At this time, the worker also sets a monitoring line using an overhead or the like of the main signal simultaneously. Then, the communication device 10-2 generates the address information from the device-unique information. The communication device 10-2 transmits a reply request for the determined address information to the management network (which is formed by the communication devices 10-1 and 10-2 at this time). When there is no reply from the other communication device 10, the communication device 10-2 determines that the address information is not duplicated and sets the previously determined address information as the address information of the communication device itself. Conversely, when there is a reply to the reply request for the determined address information, the address information is changed and it is checked again whether the address information is duplicated. When the address information is set in the communication device 10-2, the communication device 10-2 notifies the communication device 10-1 of the address information and acquires the address information from the communication device 10-1.

Likewise, the communication device 10-3 also generates the address information automatically assigned from the device-unique information, performs a duplication check, and sets the address information. The communication device 10-3 notifies the communication device 10-2 of the address information and acquires the address information of the communication device 10-2. The construction of the management network is completed between the communication devices 10-1 to 10-3 in the above-described order. At this time, when the management device 30 is connected to the communication device 10-3, the address information can be designated from the management device 30 and connection to the communication device 10-3 can be achieved. Further, when the management device 30 transmits an adjacent address notification request to request the address information of an adjacent device of the communication device 10-3, the adjacent address notification unit 111 of the communication device 10-3 transmits the address information stored by the adjacent address storage unit 110 to the management device 30. Thus, the management device 30 can understand the address information of the communication device 10-2 which is the adjacent device of the communication device 10-3. Likewise, the management device 30 can understand the address information of the communication device 10-1 by transmitting the adjacent address notification request to the communication device 10-2. Accordingly, the management device 30 can access all of the communication devices 10 forming the management network.

It is assumed that the network operates for a moment after the initial setting of the communication devices 10-1 to 10-3, and then the initial setting of the main signal relation of the communication devices 10-4 to 10-6 is performed using the maintenance terminals 20-4 to 20-6. At this time, the address information is set also in the communication devices 10-4 to 10-6, as in the above-described communication devices 10-1 to 10-3. At this time, since the address information assigned to the communication devices 10-4 to 10-6, in addition to the address information of the communication devices 10-1 to 10-3, is subjected to the duplication check, the address information assigned to each of communication devices 10 is not duplicated. The management device 30 can recognize the address information of the communication device 10-6, by referring to the address information of the adjacent address of the communication device 10-1. Likewise, by tracing the address information of the adjacent device from the communication device 10-6, the address information of the communication devices 10-4 and 10-5 can be recognized. As described above, the management device 30 can access all of the communication devices 10-1 to 10-6.

The communication devices 10-7 to 10-9 can be added to the management network through the same process as the process performed on the communication devices 10-4 to 10-6. Since the automatically assigned address information, in addition to the address information of the communication devices 10-1 to 10-6, is subjected to the duplication check, the addresses are not duplicated in the entire management network. Further, the management device 30 can recognize the address information of the communication devices 10-7 to 10-9, by referring to the address information of the adjacent device of the communication device 10-3.

By performing the initial setting of the main signal relation of the network illustrated in FIG. 1 in the above-described order, the initial setting (setting of the address information) of the management network is automatically completed. Accordingly, the management device 30 located at a remote place can access all of the communication devices 10 on the network.

Thus, according to this embodiment, when the reply to the reply request sent to a device having the address information generated by the address generation unit 102 is not returned, the generated address information is determined as the address information of the communication device itself. Thus, even when a server device is not provided in the management network, the management network can be constructed of only the communication devices 10.

In particular, according to this embodiment, the address generation unit 102 first determines the address information using a value for which the device-unique information is obtained as the parameter of the unidirectional function. Thus, the address generation unit 102 can first generate address information for which the duplication possibility with the other communication devices 10 is low.

The embodiment of the invention has been described in detail above with reference to the drawings, but the specific configuration is not limited to the above-described configuration. Various design modifications or the like can be made within the scope of the invention without departing from the gist of the invention.

For example, after the automatic assignment of the address information is completed and the management device 30 can access all of the communication devices 10, the address system of the management network selected by an administrator can be re-set again before actual operation.

Thus, in this embodiment, since the automatically assigned address information can be used only for the access from the management device 30 to the communication devices 10 before the actual operation and the address information of the management network selected by the user in the actual operation can be set manually, it is possible to adapt to a need of the administrator which is to set the address information with any address system in the management network.

In this embodiment, the example in which when the reply reception unit receives the reply, the changing unit 105 instructs the address generation unit 102 to generate another address so that the address information different from the address information generated previously by the address generation unit 102 is generated has been described. However, the invention is not limited thereto. Address information different from the address information generated previously by the address generation unit 102 may be generated according to another method. For example, by causing the changing unit 105 to rewrite the unidirectional function stored in advance by the address generation unit 102 to another unidirectional function, the address information different from the address information generated previously by the address generation unit 102 may be generated. For example, a random digit generated based on the device-unique information by the address generation unit may be used for the address information.

The above-described communication device 10 includes a computer system. An operation of each processing unit described above is stored in a computer-readable recording medium in a format of a program, and thus the process can be performed by causing a computer to read and execute the program. Here, the computer-readable recording medium is a magnetic disk, a magneto-optical disc, a CD-ROM, a DVD-ROM, a semiconductor memory, or the like. The computer program may be delivered to a computer via a communication line and the computer receiving the program may execute the delivered program.

The program may be a program configured to realize some of the above-described functions.

The program may be a so-called differential file (differential program) that can be realized by combining the above-described functions with a program which is already recorded in a computer system.

Priority is claimed on Japanese Patent Application No. 2010-285839, filed Dec. 22, 2010, the content of which is incorporated herein by reference.

INDUSTRIAL APPLICABILITY

A management network can be constructed of only communication devices without providing a server device to the management network.

DESCRIPTION OF REFERENCE SYMBOLS

1: hand scanner housing
10: communication device
10-1: communication device
10-2: communication device
10-3: communication device
10-4: communication device
10-5: communication device
10-6: communication device
10-7: communication device
10-8: communication device
10-9: communication device
20-1: maintenance terminal
20-2: maintenance terminal
20-3: maintenance terminal
20-4: maintenance terminal
20-5: maintenance terminal
20-6: maintenance terminal
20-7: maintenance terminal
20-8: maintenance terminal
20-9: maintenance terminal
30: management device
101: device-unique information storage unit
102: address generation unit
103: reply request transmission unit
104: reply reception unit
105: changing unit
106: address setting unit
107: address storage unit
108: address transmission unit
109: adjacent address reception unit
110: adjacent address storage unit
111: adjacent address notification unit
112: replying unit

The invention claimed is:

1. A communication device connected to other communication devices to form a management network, the device comprising:
    data storage and a processor, the processor comprising:
        an address generation unit configured to generate, by executing an address generation process stored in the data storage, address information which specifies the address generation unit;
        a reply request transmission unit configured to transmit, by executing a reply request transmission process stored in the data storage, a reply request to request a reply from an other communication device having the address information generated by the address generation unit;
        a reply reception unit configured to receive the reply to the reply request within a predetermined time after the transmission of the reply request and to determine that the reply to the reply request is not received when no reply to the reply request is received within the predetermined time; and
        an address setting unit configured to set, by executing an address setting process stored in the data storage, the address information generated by the address generation unit as address information of the communication device when the reply to the reply request is not received,
    wherein the address generation unit generates address information different from the previously generated address information when the reply to the reply request is received.

2. The communication device according to claim 1,
wherein the address generation unit is further configured to generate the address information from device-unique information intrinsic to the communication device using a unidirectional function, and
wherein the processor further comprises:
a changing unit configured to change, by executing a changing process stored in the data storage, the unidirectional function when a reply to the reply request transmitted by the reply request transmission unit is not received.

3. The communication device according to claim 1, wherein the processor further comprises:
an address transmission unit configured to transmit, by executing an address transmission process stored in the data storage, address information determined by an address determination unit to the other communication device directly connected to the communication device;
an adjacent address reception unit configured to receive, by executing an adjacent address reception process stored in the data storage, the address information of the other communication device from the directly-connected other communication device;
an adjacent address recording unit configured to receive, by executing an adjacent address recording process stored in the data storage, the address information received by the adjacent address reception unit in an adjacent address storage unit; and
an adjacent address notification unit configured to transmit, by executing an adjacent address notification process stored in the data storage, the address information stored in the adjacent address storage unit to a management device managing the management network when an adjacent address notification request to request the address information of the other communication device directly connected to the communication device is received from the management device.

4. A method for setting a communication device, the communication device comprising a processor and data storage and connected to other communication devices to form a management network using the communication device, the method comprising:
an address generation unit, of the processor, generating address information which specifies the address generation unit;
a reply request transmission unit, of the processor, transmitting a reply request to request a reply from an other communication device having the address information generated by the address generation unit;
a reply reception unit of the processor determining that the reply to the reply request is received when the reply to the reply request is received within a predetermined time after the transmission of the reply request and the reply reception unit determining that the reply to the reply request is not received when no reply is received within the predetermined time;
the address generation unit generating address information different from previously generated address information when the reply to the reply request is received; and
an address setting unit, of the processor, setting the address information generated by the address generation unit as address information of the communication device when the reply to the reply request is not received.

5. A non-transitory computer-readable recording medium having a computer-executable program stored therein, wherein the program causes a computer of a communication device connected to other communication devices via a network to form a management network to function as:
an address generation unit configured to generate address information which specifies the address generation unit;
a reply request transmission unit configured to transmit a reply request to request a reply from the other communication device having the address information generated by the address generation unit;
a reply reception unit configured to determine that the reply to the reply request is received when the reply to the reply request is received within a predetermined time after the transmission of the replay request and to determine that the replay to the reply request is not received when no reply to the replay request is received within the predetermined time; and
an address setting unit configured to set the address information generated by the address generation unit as address information of the communication device when the reply to the reply request is not received,
wherein the address generation unit generates address information different from the previously generated address information when the reply to the reply request is received.

* * * * *